United States Patent [19]

Miller et al.

[11] Patent Number: 6,012,283
[45] Date of Patent: *Jan. 11, 2000

[54] METHOD AND APPARATUS FOR REDUCING POLLUTANTS

[75] Inventors: Robert N. Miller, Acworth, Ga.; Robert P. Caren, Westlake Village, Calif.; Jack A. Ekchian, Belmont, Mass.

[73] Assignee: Lockheed Martin Corp., Bethesda, Md.

[ * ] Notice: This patent is subject to a terminal disclaimer.

[21] Appl. No.: 09/103,249

[22] Filed: Jun. 23, 1998

Related U.S. Application Data

[63] Continuation of application No. 08/761,955, Jun. 28, 1996, Pat. No. 5,806,305, which is a continuation-in-part of application No. 08/575,698, Dec. 19, 1995, Pat. No. 5,692,481, which is a continuation-in-part of application No. 08/245,327, May 18, 1994, abandoned.

[51] Int. Cl.[7] .............................. F01N 3/20; F01N 3/30; B01J 19/08
[52] U.S. Cl. ................ 60/274; 60/275; 60/303; 60/304; 422/186.12; 422/186.21; 422/186.3; 423/212
[58] Field of Search ................ 60/274, 275, 282, 60/285, 286, 303, 304, 305, 306; 123/539, 567; 423/212; 422/186.12, 186.21, 186.3, 177, 179

[56] References Cited

U.S. PATENT DOCUMENTS

| | | | |
|---|---|---|---|
| 1,333,836 | 3/1920 | Csanyi | 205/628 |
| 1,725,661 | 8/1929 | McPartland | 422/186.08 |
| 1,982,484 | 11/1934 | Runge | 123/537 |
| 3,188,167 | 6/1965 | Sprecht | 423/212 |
| 3,896,616 | 7/1975 | Keith et al. | 60/274 |
| 3,979,193 | 9/1976 | Sikich | 96/54 |
| 4,041,922 | 8/1977 | Abe et al. | 123/260 |
| 4,118,193 | 10/1978 | Neti et al. | 422/94 |
| 4,195,606 | 4/1980 | Wallis, Jr. et al. | 123/539 |
| 4,308,844 | 1/1982 | Persinger | 123/539 |
| 4,309,199 | 1/1982 | Suzuki | 96/18 |
| 4,434,771 | 3/1984 | Slomnicki | 123/539 |
| 4,519,357 | 5/1985 | McAllister | 123/539 |
| 4,945,721 | 8/1990 | Cornwell et al. | 60/274 |
| 4,968,396 | 11/1990 | Harvey | 205/688 |
| 5,010,869 | 4/1991 | Lee | 123/539 |
| 5,050,377 | 9/1991 | Eng | 60/303 |
| 5,097,665 | 3/1992 | Kammel | 60/275 |
| 5,154,807 | 10/1992 | Harvey | 205/688 |
| 5,284,556 | 2/1994 | Rich | 204/164 |
| 5,433,832 | 7/1995 | Rich et al. | 204/164 |
| 5,474,747 | 12/1995 | Hayashi et al. | 422/177 |
| 5,487,874 | 1/1996 | Gibboney, Jr. | 422/186.03 |
| 5,649,517 | 7/1997 | Poola et al. | 60/274 |
| 5,692,481 | 12/1997 | Miller | 123/539 |
| 5,806,305 | 9/1998 | Miller et al. | 60/274 |

FOREIGN PATENT DOCUMENTS

| | | |
|---|---|---|
| 1364716 | 10/1964 | France . |
| 2481945 | 11/1981 | France . |
| 4400653 | 7/1995 | Germany . |
| 4-276167 | 10/1992 | Japan . |
| 5-332128 | 12/1993 | Japan . |

OTHER PUBLICATIONS

Rogers et al., "The Removal of Nitric Oxide using a Non–Thermal Plasma Discharge Device", http.//www.gnt.nct/–rogersjw/nox/nox.html (No Date Given).

Southwest Research Institute (SwRI) News release, 1996, "SwRI nonthermal plasma reactor neutralizes harmful emissions", http://www.swri.org/9what/releases/plasma.htm.

Primary Examiner—Willis R. Wolfe
Attorney, Agent, or Firm—Pennie & Edmonds LLP

[57] ABSTRACT

A method and apparatus are provided for improving the conversion efficiency of a catalytic converter for treating exhaust gases produced from the combustion of a fuel to at least reduce pollutants from incomplete combustion, wherein the reduction in pollutants is achieved by the introduction of ozone, upstream from the catalytic converter, to improve the efficiency of the catalytic converter.

99 Claims, 3 Drawing Sheets

Step 1

> Adding Ozone to the combustion flow at least one point upstream from a catayltic converter for treating exhaust gases produced from the combustion of a fuel to at least reduce one pollutant from incomplete Combustion and/or oxides of nitrogen

Step 2

> Treating the exhaust gases with the catalytic converter

FIG. 5

METHOD AND APPARATUS FOR REDUCING POLLUTANTS

This is a Continuation of U.S. application Ser. No. 08/761,955 filed Jun. 28, 1996, now U.S. Pat. No. 5,806,305 which is a Continuation-in-Part of U.S. application Ser. No. 08/575,698 filed Dec. 19, 1995, now U.S. Pat. No. 5,692,481 which is a Continuation-in-Part of U.S. application Ser. No. 08,245,327 filed May 18, 1994, now abandoned.

BACKGROUND OF THE INVENTION

1. Field of the Invention

The present invention generally relates to a method and apparatus for reducing pollutants by improving the conversion efficiency of a catalytic converter for treating exhaust gases produced from the combustion of fuels, and more particularly, to such a method and apparatus wherein the reduction in pollutants is achieved by the use of ozone.

2. Background

Internal combustion engines, which operate by the controlled combustion of hydrocarbon fuels, produce exhaust gases containing complete combustion products of $CO_2$ and $H_2O$ and also pollutants from incomplete combustion, such as CO, which is a direct poison to human life as well as unburnt hydrocarbons (HC). Further, due to the very high temperatures produced by the burning of the hydrocarbon fuels, thermal fixation of nitrogen in the air results in the detrimental formation of $NO_x$.

The quantity of pollutants varies with many operating conditions of the engine but is influenced predominantly by the air-to-fuel ratio in the combustion cylinder such that conditions conducive to reducing carbon monoxide and unburnt hydrocarbons (a fuel mixture just lean of stoichiometric and high combustion temperatures) cause an increased formation of $NO_x$ and conditions conducive to reducing the formation of $NO_x$ (rich fuel mixture and low combustion temperatures) cause an increase in carbon monoxide and unburnt hydrocarbons in the exhaust gases of the engine. As a result, within the region of stable operation of the internal combustion engine, a significant amount of CO, HC and $NO_x$ is emitted into the atmosphere.

Although the presence of pollutants in the exhaust gases of internal combustion engines has been recognized since 1901, the need to control internal combustion engine emissions in the U.S. came with the passage of the Clean Air Act in 1970. Engine manufacturers have explored a wide variety of technologies to meet the requirements of the Clean Air Act. Catalysis has proven to be the most effective passive system.

Auto emission catalytic converters are typically located at the underbody of the automobile and are situated in the exhaust stream from the engine, just before the muffler, which is an extremely hostile environment due to the extremes of temperature as well as the structural and vibrational loads encountered under driving conditions.

Nearly all auto emission catalytic converters are housed in honeycomb monolithic structures that are generally made of cordierite, a low-thermal-expansion ceramic with excellent strength and crack resistance under thermal shock. The honeycomb construction provides a relatively low pressure drop and a high geometric surface area that enhances the mass-transfer-controlled reactions.

An adherent washcoat, generally made of stabilized gamma alumina into which the catalytic components are incorporated, is deposited on the walls of the honeycomb. The active catalyst contains about 0.1 to 0.15% precious metals, primarily platinum (Pt), palladium (Pd) or rhodium (Rh). The honeycomb is set in a steel container and protected from vibration by a resilient matting.

The first generation of catalytic converters, from 1976 to 1979 focused solely on the oxidation of CO and HC. $NO_x$ was decreased by engine modification and operating conditions and not addressed by use of catalysis. In contradistinction, the second generation of catalytic converters, from 1979 to 1986, not only oxidized CO and HC, but also reduced $NO_x$.

Because $NO_x$ reduction is most effective in the absence of $O_2$, while the abatement of CO and HC requires $O_2$, the construction of an effective means of reducing these emissions requires that the engine be operated close to the stoichiometric air-to-fuel ratio, because, only under these conditions can all three pollutants be converted simultaneously. The use of an oxygen sensor, which is positioned before the catalyst, makes it possible to maintain the air-to-fuel ratio within the narrow window required so that three-way catalysis (TWC) is possible.

Because the exhaust oscillates from slightly rich to slightly lean as a result of system time lag in adjusting the ratio, an oxygen storage medium is added to the washcoat that adsorbs (stores) oxygen during the lean part of the cycle and releases it to react with excess CO and HC during the rich portion. $CeO_2$ is most frequently used for this purpose due to its desirable reduction-oxidation response.

TWC technology for simultaneously converting all three pollutants comprises the use of precious metals Pt and Rh (Pt-to-Rh ratio of 5-to-1), with Rh being most responsible for the reduction of $NO_x$, although it also contributes to CO oxidation along with Pt. The basic operation of the catalyst is to oxidize CO and HC to $CO_2$ and $H_2O$ and reduce $NO/NO_2$ to $N_2$.

Third generation converters, i.e., those from 1986 to 1992, evolved as auto operating strategies shifted to include greater fuel economy at higher operating speeds, by shutting off fuel during deceleration, which exposed TWC's to higher temperatures and a highly oxidizing atmosphere, causing Rh to react with the gamma alumina of the washcoat and form an inactive aluminate. Properly designed catalysts recover their activity to a great extent under rich fuel mixtures, however, Rh may also react with $CeO_2$ at high temperature, reducing the activity of both. This drawback is overcome by segregating the two in washcoats with multiple layers or by stabilizing the ceria with oxides of Zr, Ba and La.

In fourth generation TWC's, which began to appear in 1995, less expensive Pd was substituted for or used in combination with Pt and Rh. While the operation of fourth generation TWC's is consistent with prior catalytic converters, there is still a significant amount of pollutants emitted into the atmosphere by the catalytically treated exhaust gases of internal combustion engines.

The recent passage of the 1990 amendment to the Clean Air Act requires further significant reductions in the amount of pollutants being released into the atmosphere by internal combustion engines. In order to comply with these requirements, restrictions on the use of automobiles and trucks have been proposed, such as, employer compelled car pooling, HOV lanes, increased use of mass transit as well as rail lines and similar actions limiting automobile and truck utilization at considerable cost and inconvenience.

An alternative to diminished automobile and truck usage is decreasing emissions by increasing the efficiency of the internal combustion engine. This approach presents a considerable challenge because studies show that 70% of automobile originated pollution is contributed by only 30% of the vehicles on the road, these vehicles typically being older models having inefficient engines that inherently produce a lot of pollution. Moreover, these older vehicles oftentimes have difficulty passing required emission tests, resulting in an increased cost to the owner for tune-ups or new catalytic converters, such maintenance procedures sometimes failing to adequately cure the problem so that the vehicle still cannot pass the required emissions test.

In addition, while considerable gains have been made in recent years to reduce the amount of pollutants in the exhaust gases of the internal combustion engine of vehicles such as automobiles and trucks, it is difficult and expensive to further reduce the amount of pollutants in the exhaust gases of the internal combustion by increasing the efficiency of engines now being designed for use in new vehicles, even though exhaust emissions of automobiles and trucks currently being manufactured do not meet proposed Environmental Protection Agency standards.

In lieu of decreasing exhaust emissions by increasing the efficiency of the internal combustion engine or decreasing the use of automobiles, a further alternative would be to increase the efficiency of the catalytic converter, however, only minimal success has been achieved.

In this regard, the conversion efficiency of a catalytic converter is measured by the ratio of the rate of mass removal in the catalytic converter of the particular constituent of interest to the mass flow rate of that constituent into the catalytic converter. The conversion efficiency of a catalytic converter is a function of many parameters including temperature, stoichiometry, the presence of any catalysts' poisons (such as lead, sulfur and carbon) the type of catalyst and the residence time of the exhaust gases in the catalytic converter. At start-up the conversion efficiency of a catalytic converter is low.

SUMMARY OF THE INVENTION

One object of the present invention to provide a method and apparatus for reducing pollutants in the exhaust gases of an internal combustion engine having a catalytic converter by improving the conversion efficiency of the catalytic converter without the need for major modifications to the internal combustion engine or the catalytic converter.

Another object of the present invention is to provide a method and apparatus for reducing pollutants of incomplete combustion in the exhaust gases treated by a catalytic converter which are inexpensive to employ and manufacture, simple in structure and operation.

A particularly advantageous feature of preferred embodiments of the present invention is that it provides a relatively inexpensive way to reduce pollution by retro-fitting those engine and catalyst combinations already on the road which contribute the most pollution and are most likely to fail an emission test as well as providing easy installation in new engine systems.

A further particularly advantageous feature of preferred embodiments of the present invention is that the improved efficiency of the catalytic converter is achieved by adding ozone to modify the composition of the gases entering the catalytic converter in real-time without the need to store special chemical additives on-board.

Yet another advantageous feature of preferred embodiments of the present invention is that it can be applied to a variety of different types of internal combustion engines, including, but not limited to, automobiles, trucks, stationary power generators, motorboats, motorcycles, motorbikes, lawn mowers, chain saws or leaf blowers which may use a variety of different fuels such as gasoline, gasoline-based formulations, diesel fuel, alcohol, natural gas and any other fuel where a catalytic converter can be used to reduce at least one pollutant.

These and other objects, advantages and features of the present invention are achieved, according to one embodiment of the present invention, by an apparatus comprising: 1) a combustion chamber having a pre-combustion flow stream, including air, to the combustion chamber and a post-combustion flow stream of exhaust from the combustion chamber, 2) a catalytic converter for treating the exhaust gases to reduce the amount of at least one pollutant from incomplete combustion of fuel and/or oxides of nitrogen, and 3) a device for adding ozone to at least one of the pre-combustion flow stream to the combustion chamber and the post-combustion flow stream from the combustion chamber upstream from the catalytic converter to reduce the amount of the at least one pollutant in exhaust gases treated by the catalytic converter.

According to one embodiment of the present invention, the device for adding ozone comprises an ultraviolet light emitting lamp that emits light having a wavelength of about 185 nanometers which is inserted into at least one of the pre-combustion flow or post-combustion flow streams so that the oxygen in the intake air, air/fuel mixture and/or exhaust gases are exposed to ultraviolet light to generate ozone which enhances the conversion efficiency of the catalytic converter.

According to another embodiment of the present invention, the device for adding ozone is positioned remotely of the pre-combustion and post-combustion flow streams and ozone enriched air is piped into the combustion flow stream. In this embodiment, the device draws in ambient air independently of the operation of the engine, for example, using a pumping mechanism. The ambient air is converted to ozone enriched air by exposure, for example, to UV light, and added to at least one of the pre-combustion or the post-combustion flow streams in accordance with the teachings of the present invention. A particularly advantageous feature of this embodiment is that it provides the flexibility of installing the ozone generator at a convenient location in the engine compartment or elsewhere on the vehicle. Another advantageous feature of this embodiment is that the ozone could be introduced at most any desirable point in the intake or exhaust streams. A further advantageous feature of this embodiment is that the flow rate of ozone from the ozone generator is independent of engine speed, i.e., flow of air to the combustion chamber or flow of exhaust gases from the combustion chamber. Thus, at low engine speeds, the mass flow rate of ozone will not be affected by low air mass flow through the combustion chamber.

In accordance with the present invention, a method is also provided for improving the conversion efficiency of a catalytic converter for treating exhaust gases to at least reduce one pollutant from incomplete combustion produced from the combustion of a fuel in a combustion chamber having a pre-combustion flow stream of at least ambient air to the combustion chamber and a post-combustion flow stream of exhaust gases from the combustion chamber, the method comprising the steps of: adding ozone to at least one of the pre-combustion and the post-combustion flow streams at at least one point upstream from a catalytic converter for treating exhaust gases produced from the combustion of the fuel to at least reduce one pollutant from incomplete combustion, and treating the exhaust gases with the catalytic converter.

BRIEF DESCRIPTION OF THE DRAWINGS

FIG. 5 is a block diagram illustrating the method of the present invention.

DETAILED DESCRIPTION OF THE PREFERRED EMBODIMENT(S)

Figure 1:
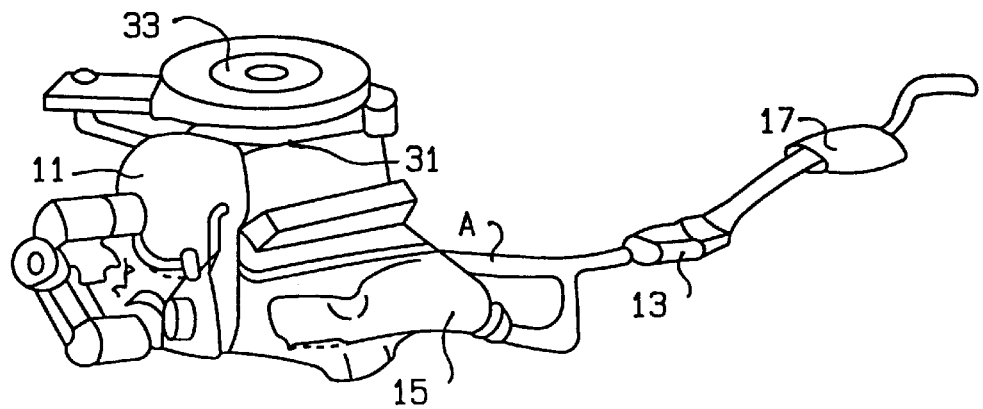
FIG. 1 is a side perspective view, of a known configuration of an internal combustion engine having a catalytic converter.

Referring to FIG. 1, a known configuration of an automobile engine 11 having a catalytic converter 13 is illustrated. The catalytic converter 13 is positioned at the underbody of the automobile (not shown) and is situated in the exhaust stream from the engine, downstream from the exhaust manifold 15 and just before the muffler 17.

The catalytic converter 13, as contemplated for use in the present invention, includes any device which is provided for treating exhaust gases from the combustion of a fuel, such as, for example, gasoline, gasoline-based formulations, diesel fuel, alcohol, natural gas and any other fuel where a catalytic converter can be used to reduce at least one pollutant from incomplete combustion, such as, for example, CO, and unburnt hydrocarbons (HC), and/or $NO_x$, including, but not limited to, a three way catalyst typically used in today's modern automobile engines.

The catalytic converter 13 comprises, therefore, any device that catalytically removes at least one pollutant from an exhaust stream generated by combusting a fuel, including, but not limited to, those with monolithic or granular ceramic substrates, metallic substrates, or substrates of any kind, and devices with noble metals or any other type of catalytic material. It would also include, without limitation, devices having semiconductor catalysts, such as, oxides or sulphides of transition elements, and devices having ceramic type catalyst, such as alumina, silica-alumina, and zeolites individually, in combination with each other or in combination with metal catalysts.

As is well understood in the art, an internal combustion engine draws in ambient air which is mixed with fuel for combustion in a combustion chamber or cylinder and the resulting exhaust gases are expelled. Ignition of the air/fuel mixture in the cylinder is typically achieved by an ignition device, such as, for example, a spark plug or the like, or adiabatic compression to a temperature above the fuel's ignition point.

The flow of air to any combustion chamber, including the flow of the air/fuel mixture if applicable, is hereinafter referred to as the pre-combustion flow stream, and the resulting flow of exhaust therefrom is hereinafter referred to as the post-combustion flow stream. As used herein, the pre-combustion and post-combustion flow streams are hereinafter collectively referred to as the combustion flow stream.

In certain internal combustion engines, such as for example, gasoline engines commonly in use today, air is inducted via an air intake duct or port which conveys the ambient air to a carburetor or fuel injection arrangement where the air is mixed with fuel to create a air/fuel mixture. The air/fuel mixture is then conveyed via an intake manifold to the combustion chamber or cylinder of the engine. In diesel-type engines and certain spark ignition engines, the air and fuel are mixed in the combustion chamber or cylinder of the engine.

After the air/fuel mixture has been burnt, the resulting exhaust gases are expelled from the combustion chamber to an exhaust manifold. The exhaust gases are then conveyed, via at least one exhaust pipe to the catalytic converter where pollutants are removed.

Figure 2:
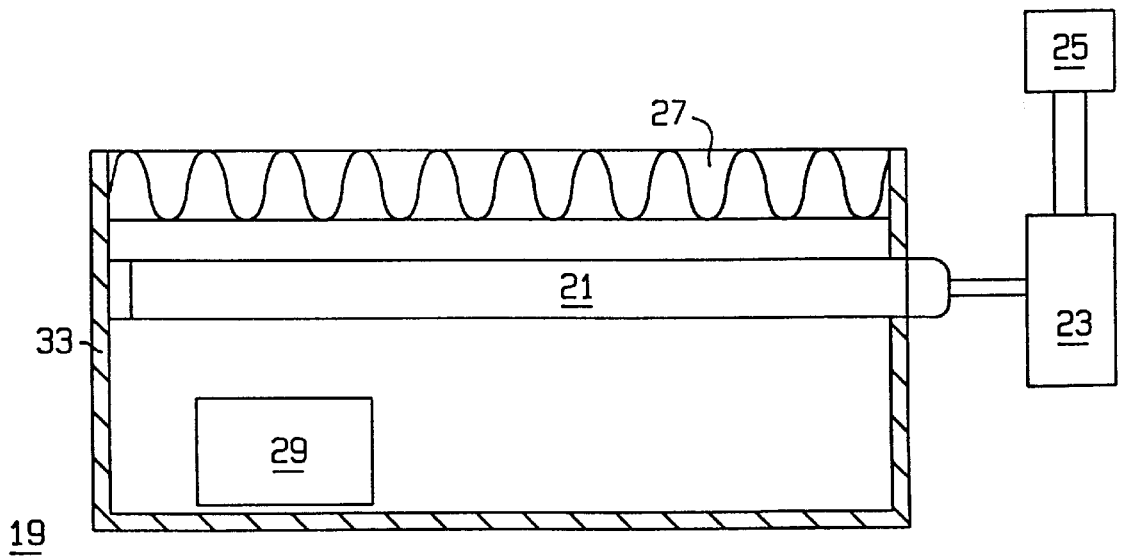
FIG. 2 is a side view, partially-in-section, illustrating one embodiment of the apparatus of the present invention wherein an ozone generating device is inserted into at least one of the pre-combustion flow or post-combustion flow streams.

Referring to FIG. 2, one embodiment of an apparatus of the present invention is illustrated generally at 19. The apparatus 19 comprises a device for generating ozone, for example, an ultraviolet light emitting lamp 21, for example, a mercury vapor arc lamp having a light transmitting envelope for transmitting ultraviolet light having a wavelength of about 185 nanometers, because this emission is capable of producing ozone in air.

The type of envelope preferred for transmitting light at a frequency of about 185 nanometers is fused silica or its equivalent, synthetic quartz. The lamp 21 is connected to a transformer 23, for example, a Bodine Model 12R25E/GS transformer, which converts 12 volt battery power to the voltage and frequency required to operate the lamp 21.

The transformer 23 is connected to the electrical system 25 of the engine 11 in order to provide power for operating the lamp 21. The transformer 23 is directly connected to the electrical system 25 of the automobile by splicing into the hot wire (not shown) of the system, for example, as original equipment on a new vehicle. Alternatively, the transformer 23 is connected to the electrical systems 25 by using a plug adapted to be inserted into a cigarette lighter receptacle in the passenger compartment of the vehicle.

In the apparatus 19 as illustrated by FIG. 2, the lamp 21 is positioned upstream from the engine's carburetor or fuel injection system, generally indicated at 31 in FIG. 1, for example, between an air filter 27 and air intake duct 29, however, the present invention additionally contemplates positioning the device for generating ozone upstream from the air filter 27.

In order to retro-fit the apparatus 19 to an existing engine 11, the air filter casing 33 is opened and the lamp 21 is placed between the air filter 27 and the air intake duct 29 and the electrical wire leads of the lamp 21 are placed so that they pass beneath the air filter cover (not shown) so that they are routed out of the casing 33, for example, between the casing 33 and its removable cover (not shown) for connection to the transformer 23.

In order to increase the effective absorption coefficient of the oxygen in the air being inducted into the engine 11, the walls adjacent to the lamp 21 are provided with a surface highly reflective to ultraviolet light in the required range, for example, made of aluminum, in order to increase the mean free path of the 185 nanometer photons, since aluminum maintains its reflectance to ultraviolet light down to 185 nanometers.

Figure 3:
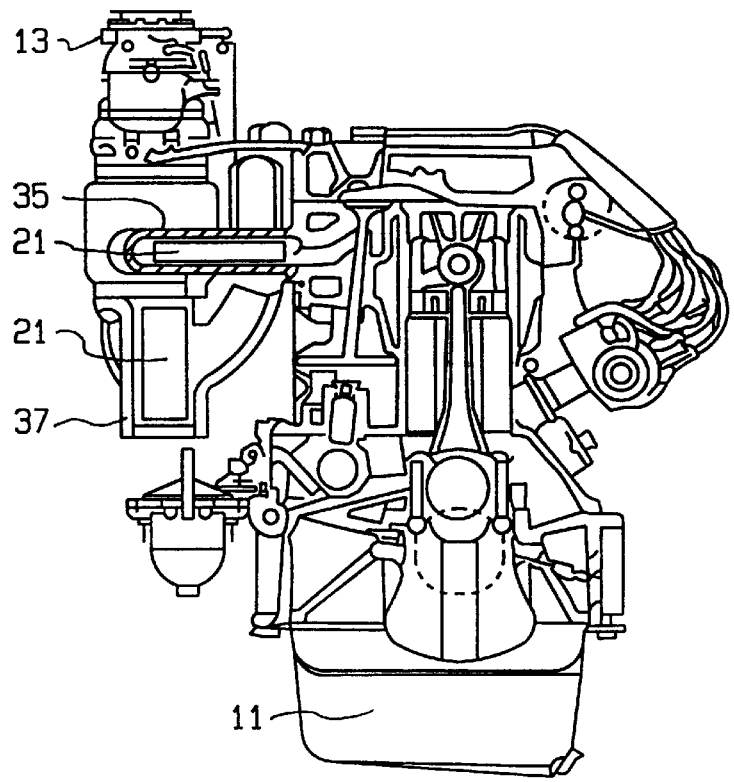
FIG. 3 is a front view, partially-in-section, illustrating a further arrangements of the apparatus of FIG. 2.

According to teaching of the present invention, it is possible to also mount the lamp 21 downstream from the engine's carburetor or fuel injection system 31 and prior to the combustion chamber, for example, in the intake manifold 35 as best seen in FIG. 3. Alternatively, the lamp 21 is mounted downstream from the engine's combustion chamber, for example, in the exhaust manifold 37 as best seen in FIG. 3. In addition, the lamp 21 can be mounted both upstream and downstream of the combustion chamber.

Figure 4:
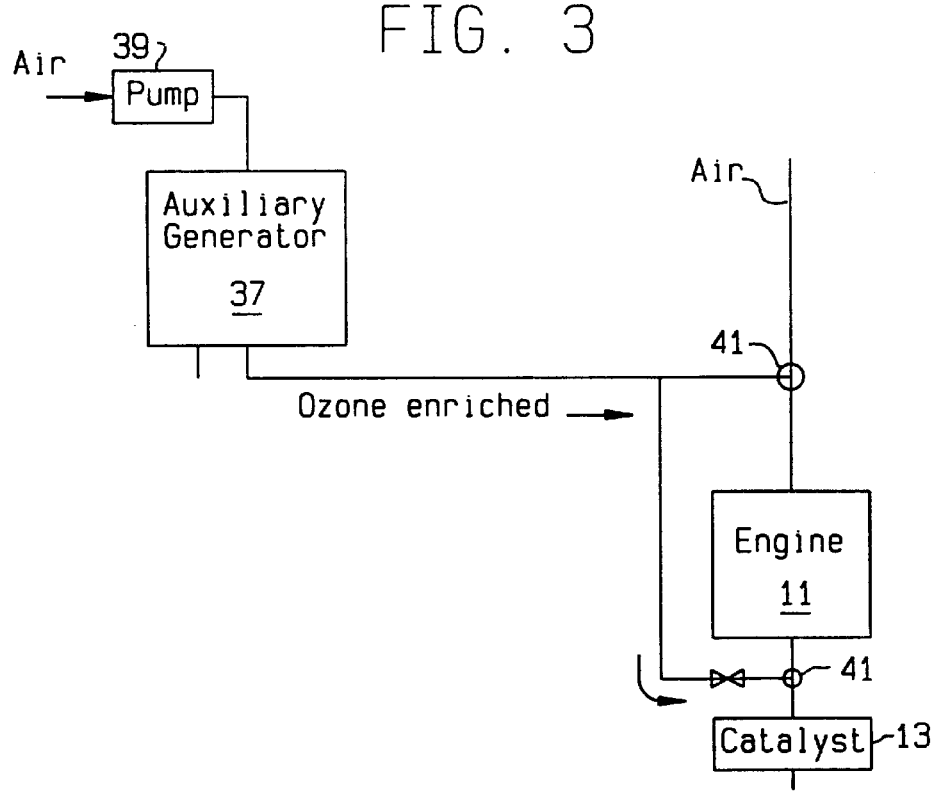
FIG. 4 is a block diagram illustrating another embodiment of the apparatus of the present invention wherein the device for adding ozone is positioned remotely of the pre-combustion and post-combustion flow streams and ozone enriched air is piped into the combustion flow stream.

Referring to FIG. 4, a further embodiment of the present invention is illustrated wherein the device for generating ozone is positioned remotely of the pre-combustion and post-combustion flow streams and ozone enriched air is piped into the combustion flow stream. In this embodiment, an auxiliary ozone generator 37 for generating ozone from air, draws in ambient air independently of the operation of the engine, for example, using a pumping mechanism 39. The ambient air is converted to ozone enriched air by exposure, for example, to UV light or by means of an electrostatic discharge device, and added to at least one of the pre-combustion or the post-combustion flow streams in accordance with the teachings of the present invention. In this regard, a mixing device 41 can be used to enhance mixing of the ozone enriched air with the combustion flow stream. It should be noted that in lieu of pumping mechanism 39, ambient air can be drawn in using the vacuum generated by the engine 11.

Table 1 compares the results obtained utilizing the ozone generating apparatus 19 which generates a trace amount of ozone and is situated in the pre-combustion flow stream, upstream from the carburetor or fuel injection system of an engine as illustrated in FIG. 2. The results of the base line tests were conducted without the ozone generating apparatus 19. The engine tested was a 1990 Ford Tarus engine equipped with a production catalytic converter.

|  | BASELINE | WITH OZONE | REDUCTION |
|---|---|---|---|
| CARBON MONOXIDE (%) | 0.28 | 0.02 | 92.8% |
| HYDROCARBONS (ppm) | 154 | 12 | 92.2% |

More extensive tests have been conducted with a 1996 Ford Taurus 3.0 L engine using the embodiment of FIG. 3, during which $NO_x$, HC, CO, and $CO_2$ levels were measured upstream as well as downstream of the catalytic converter. It should be noted that this type of engine has two catalytic converters, one connected to the right exhaust manifold and another connected to the left exhaust manifold. The results of these tests are as forth below.

| IDLE CONDITIONS EMISSIONS | PPM/PERCENT | LEFT CAT-IN. | LEFT CAT-OUT | RIGHT CAT-IN | RIGHT CAT-OUT |
|---|---|---|---|---|---|
| WITH DEVICE OFF BASELINE | | | | | |
| NOX | PPM | 131 | 2.5 | 116 | 1.2 |
| HC | PPM | 2593 | 278 | 2484 | 137 |
| CO | PPM | 5000 | 400 | 5000 | 10 |
| $CO_2$ | % | 13.72 | 14.26 | 13.8 | 14.6 |
| WITH DEVICE ON | | | | | |
| NOX | PPM | 127 | 0.2 | 117 | 1.1 |
| HC | PPM | 3048 | 2 | 2731 | 2 |
| CO | PPM | 5000 | 0 | 5000 | 0 |
| $CO_2$ | % | 13.87 | 13.9 | 13.99 | 14.27 |

It should be noted that the embodiments of the present invention discussed above are illustrative examples. In this regard, while the use of radiant energy to produce ozone is described above, the present invention is not so limited and other devices, well known in the art, which produce ozone are envisioned as sources for adding ozone to the combustion flow stream in accordance with the teachings of the present invention.

In addition, it should be noted that the only requirement of the present invention is that the ozone is added to the combustion flow stream at at least one point upstream of the catalytic converter, for example, the air intake duct to the carburetor or fuel injection systems of the combustion chamber, the air/fuel intake manifold to the combustion chamber, the combustion chamber directly or the exhaust manifold of the combustion chamber, or the exhaust pipe A as shown in FIG. 1.

Referring to FIG. 4, the method of the present invention is illustrated and comprises the steps of: 1) adding ozone to the combustion flow stream at at least one point upstream from a catalytic converter for treating exhaust gases produced from the combustion of a fuel to at least reduce one pollutant from incomplete combustion and/or oxides of nitrogen, and 2) treating the exhaust gases with the catalytic converter.

Although the present invention has been described with particular reference to its preferred embodiments, it should be understood that many variations and modifications will now be obvious to those skilled in that art, and it is preferred, therefore, that the scope of the invention be limited, not be the specific disclosure herein, but only by the appended claims.

What is claimed is:

1. A method of reducing at least one pollutant in an exhaust gas produced from the combustion of fuel, the method comprising:

passing at least a portion of the exhaust gas through a catalytic convertor having an inlet and an outlet;

introducing ozone into the exhaust gas prior to the outlet of the catalytic converter, thereby producing an ozone enriched exhaust gas; and passing the ozone enriched exhaust gas through at least a portion of the catalytic converter, thereby reducing at least one pollutant, selected from the group consisting of unburnt hydrocarbons, carbon monoxide and oxides of nitrogen, from a first concentration to a second lower concentration.

2. The method of claim 1, further comprising producing the ozone with an ozone generator positioned remotely from the exhaust gas.

3. The method of claim 1, further comprising generating ozone in the exhaust gas.

4. The method of claim 3, further comprising generating the ozone by means of radiation which converts oxygen to ozone.

5. The method of claim 3, further comprising generating the ozone by means of an electrostatic discharge device.

6. The method of claim 3, further comprising generating the ozone with an ozone generator powered by an approximately 12 volt power source.

7. The method of claim 3, further comprising continuously adding ozone to the exhaust gas.

8. The method of claim 3, further comprising continuously powering an ozone generator to generate the ozone.

9. The method of claim 8, further comprising using a three-way catalytic convertor as the catalytic converter.

10. The method of claim 8, further comprising generating the ozone by means of an electrostatic discharge device.

11. The method of claim 10, further comprising using a three-way catalytic convertor as the catalytic converter.

12. The method of claim 3, further comprising generating the ozone by means of a low power ozone generator.

13. The method of claim 12, further comprising consuming from about 4 to about 40 watts of power with the low power ozone generator.

14. The method of claim 13, further comprising the combustion of fuel in an internal combustion engine, thereby producing the exhaust gas.

15. The method of claim 14, further comprising using a fuel comprising gasoline.

16. The method of claim 14, further comprising using diesel fuel as the fuel.

17. The method of claim 14, wherein the engine is a spark-ignition engine.

18. The method of claim 17, further comprising using a three-way catalytic convertor as the catalytic converter.

19. The method of claim 17, further comprising providing an approximately stoichiometric air fuel mixture to the engine.

20. The method of claim 17, further comprising providing an oxygen rich air fuel mixture to the engine.

21. An apparatus for reducing at least one pollutant in an exhaust gas stream containing exhaust gas formed from the combustion of fuel, the apparatus comprising:
   a catalytic convertor, having an inlet and an outlet, wherein the catalytic convertor is positioned such that at least a portion of the exhaust gas stream passes through the catalytic convertor;
   a passageway for conducting that portion of the exhaust gas stream that passes through the catalytic convertor to the catalytic convertor; and
   an ozone generator for adding ozone to that portion of the exhaust gas stream that passes through the catalytic converter.

22. The apparatus of claim 21, wherein the ozone generator is configured and adapted to add the ozone to the exhaust gas stream before the outlet of the catalytic converter.

23. The apparatus of claim 22, wherein the ozone generator is an electrostatic discharge device.

24. The apparatus of claim 23, wherein the ozone generator is positioned remotely from the passageway for the exhaust gases.

25. The apparatus of claim 23, wherein the ozone generator uses low power.

26. The apparatus of claim 25, wherein the exhaust passageway forms at least a portion of the exhaust system of a mobile vehicle.

27. The apparatus of claim 22, wherein the ozone generator is at least partially positioned in the passageway for the exhaust gases.

28. The apparatus of claim 27 used in the treatment of exhaust gas formed from the combustion of fuel at or substantially near stoichiometric conditions.

29. The apparatus of claim 27 used in the treatment of exhaust gas formed from the combustion of gas under oxygen-rich conditions.

30. The apparatus of claim 27 used in the treatment of exhaust gas formed from the combustion of gasoline in a spark-ignition internal combustion engine.

31. The apparatus of claim 27 used in the treatment of exhaust gas formed from the combustion of diesel fuel in an internal combustion engine.

32. The apparatus of claim 27 used in the treatment of exhaust gas formed from the combustion of gasoline by a spark-ignition device at or substantially near stoichiometric conditions.

33. The apparatus of claim 27 used in the treatment of exhaust gas formed from the combustion of gasoline by a spark-ignition device under oxygen-rich conditions.

34. The apparatus of claim 27, wherein the catalytic converter is a three-way catalytic converter.

35. The apparatus of claim 34, wherein the exhaust gases are produced by an internal combustion engine which burns fuel at or substantially near stoichmetric conditions.

36. The apparatus of claim 27, wherein the ozone generator comprises at least one discharge device.

37. The apparatus of claim 36 used in the treatment of exhaust gas formed from the combustion of fuel at or substantially near stoichiometric conditions.

38. The apparatus of claim 36 used in the treatment of exhaust gas formed from the combustion of gas under oxygen-rich conditions.

39. The apparatus of claim 36 used in the treatment of exhaust gas formed from the combustion of gasoline in a spark-ignition internal combustion engine.

40. The apparatus of claim 36 used in the treatment of exhaust gas formed from the combustion of diesel fuel in an internal combustion engine.

41. The apparatus of claim 36 used in the treatment of exhaust gas formed from the combustion of gasoline by a spark-ignition device at or substantially near stoichiometric conditions.

42. The apparatus of claim 36 used in the treatment of exhaust gas formed from the combustion of gasoline by a spark-ignition device under oxygen-rich conditions.

43. The apparatus of claim 36, wherein the catalytic converter is a three-way catalytic converter.

44. The apparatus of claim 43 used in the treatment of exhaust gas formed from the combustion of fuel at or substantially near stoichiometric conditions.

45. The apparatus of claim 43 used in the treatment of exhaust gas formed from the combustion of gas under oxygen-rich conditions.

46. The apparatus of claim 43 used in the treatment of exhaust gas formed from the combustion of gasoline in a spark-ignition internal combustion engine.

47. The apparatus of claim 43 used in the treatment of exhaust gas formed from the combustion of diesel fuel in an internal combustion engine.

48. The apparatus of claim 43 used in the treatment of exhaust gas formed from the combustion of gasoline by a spark-ignition device at or substantially near stoichiometric conditions.

49. The apparatus of claim 43 used in the treatment of exhaust gas formed from the combustion of gasoline by a spark-ignition device under oxygen-rich conditions.

50. The apparatus of claim 27, wherein the ozone generator comprises a source of radiant energy to generate ozone.

51. The apparatus of claim 50, wherein the ozone generator comprises an ultraviolet lamp.

52. The apparatus of claim 51, wherein the ultraviolet lamp comprises a mercury vapor arc lamp which emits light having a wavelength of about 185 nanometers.

53. The apparatus of claim 36, wherein the ozone generator is an electrostatic discharge device.

54. The apparatus of claim 53, wherein the ozone generator uses low power.

55. The apparatus of claim 54, wherein the ozone generator uses approximately 4 to approximately 40 watts of power.

56. The apparatus of claim 55, further comprising a battery to power the ozone generator.

57. The apparatus of claim 56, wherein the ozone generator is configured and adapted to continuously generate ozone during the combustion of fuel.

58. The apparatus of claim 57, wherein the passageway is connected to an internal combustion engine through an exhaust manifold.

59. The apparatus of claim 58, wherein the catalytic converter is a three-way catalytic converter.

60. The apparatus of claim 59 applied to the treatment of exhaust gases produced by an internal combustion engine which burns fuel at or substantially near stoichiometric conditions.

61. The apparatus of claim 59 applied to the treatment of exhaust gases produced by an internal combustion engine which burns fuel under oxygen-rich conditions.

62. An apparatus for reducing at least one pollutant in the exhaust gas formed from combusting fuel at or substantially near stoichmetric conditions in an internal combustion engine, the apparatus comprising:

a three-way catalytic convertor, having an inlet and an outlet, wherein the three-way catalytic convertor is positioned such that at least a portion of the exhaust gas from the engine passes through the three-way catalytic convertor;

a passageway for conducting that portion of the exhaust gas that passes through the three-way catalytic convertor to the three-way catalytic convertor; and an ozone generator located in the passageway for adding ozone to that portion of the exhaust gas that passes through the catalytic converter before the outlet of the three-way catalytic convertor.

63. The apparatus of claim 62, wherein the ozone generator is continuously powered when the engine is running.

64. The apparatus of claim 63, wherein the ozone generator is configured and adapted to consume low power.

65. The apparatus of claim 64, used to reduce the pollutants formed from combusting gasoline in a spark-ignition internal combustion engine.

66. The apparatus of claim 65, wherein the ozone generator is a discharge device.

67. The apparatus of claim 66, wherein the ozone generator configured and adapted to consume approximately 4 to approximately 40 watts.

68. The apparatus of claim 67, wherein the ozone generator is an discharge device.

69. The apparatus of claim 68, wherein the discharge device is an electrostatic discharge device.

70. The device of claim 68, wherein the discharge device is located in the exhaust passageway.

71. The device of claim 68, wherein the discharge device is located outside the exhaust passageway, and is configured and adapted to add ozone to the exhaust gas.

72. The apparatus of claim 63, wherein the ozone generator is configured and adapted to provide radiant energy to generate ozone.

73. The apparatus of claim 72, wherein the ozone generator comprises an ultraviolet lamp.

74. The apparatus of claim 73, wherein the ozone generator comprises a mercury vapor arc lamp which emits light having a wavelength of about 185 nanometers.

75. The apparatus of claim 74, wherein the ozone generator is configured and adapted to consume approximately 4 to approximately 40 watts of power.

76. The apparatus of claim 75, wherein the ozone generator is configured and adapted to continuously create ozone when the engine is running.

77. A method for the reduction of at least one pollutant in an exhaust gas stream containing exhaust gas formed from the combustion of fuel at or substantially near stoichmetric conditions in an internal combustion engine having an exhaust passageway for conducting the exhaust stream to an inlet of a three-way catalytic converter having an outlet, the method comprising:

passing the exhaust stream through the exhaust passageway; and forming ozone in situ in the exhaust gas in the exhaust passageway prior to the outlet of the three-way catalytic converter.

78. The method of claim 79, further comprising positioning a discharge device in the exhaust passageway to form ozone in situ in the exhaust passageway.

79. The method of claim 77, further comprising positioning a source of ozone generation which produces radiant energy to convert oxygen to ozone in the exhaust passageway.

80. The method of claim 79, further comprising producing the radiant energy from the source by means of an ultraviolet lamp.

81. The method of claim 79, further comprising producing the radiant energy from the source by means of a mercury vapor arc lamp which emits light having a wavelength of about 185 nanometers.

82. The method of claim 77, further comprising forming ozone positioning an ozone generator which consumes low power in the exhaust passageway, and powering the ozone generator by means of the electrical system of the internal combustion engine.

83. The method of claim 82, further comprising generating the ozone by means of an ultraviolet lamp.

84. The method of claim 83, further comprising consuming from about 4 to about 40 watts of power with the low power ozone generator.

85. The method of claim 82, further comprising generating the ozone by means of a discharge device.

86. The method of claim 85, wherein the discharge device is an electrostatic discharge device.

87. The method of claim 85, further comprising the combustion of gasoline in a spark-ignition internal combustion engine.

88. The method of claim 85, further comprising the combustion of diesel fuel in an internal combustion engine.

89. The method of claim 82, wherein the discharge device consumes low power and is powered by the electrical system of the internal combustion engine.

90. The method of claim 89, wherein the discharge device consumes approximately 4 to approximately 40 watts of power.

91. A low power apparatus for reducing at least one pollutant in the exhaust gas formed from combustion of fuel in an internal combustion engine in a mobile vehicle having an exhaust manifold, the internal combustion engine having an electrical system comprising a direct current battery, the apparatus comprising:

an exhaust manifold connecting the engine to a passageway for at least a portion of the exhaust gas;

a catalytic converter having an inlet and an outlet located in the passageway; and a low power ozone generator for forming ozone located in the exhaust passageway; wherein the ozone generator is connected to the electrical system of the combustion engine, and is configured and adapted to consume approximately 4 to approximately 40 watts, and continuously generate ozone without interruption while the engine is running.

92. The apparatus of claim 91, wherein the ozone generator comprises at least one discharge device.

93. The apparatus of claim 91 used in the treatment of exhaust gas formed from the combustion of fuel at or substantially near stoichmetric conditions.

94. The apparatus of claim 91 used in the treatment of exhaust gas formed from the combustion of fuel under oxygen-rich conditions.

95. The apparatus of claim 91 used in the treatment of exhaust gas from the combustion of gasoline in a spark-ignition internal combustion engine.

96. The apparatus of claim 91 used in the treatment of exhaust gas from the combustion of diesel fuel in an internal combustion engine.

97. The apparatus of claim 91 used in the treatment of exhaust gas from the combustion of gasoline by a spark-ignition device at or substantially near stoichmetric conditions.

98. The apparatus of claim 91 used in the treatment of exhaust gas from the combustion of gasoline by a spark-ignition device under oxygen-rich conditions.

99. The apparatus of claim 91, wherein the catalytic convertor is a three-way catalytic converter.

* * * * *

UNITED STATES PATENT AND TRADEMARK OFFICE
CERTIFICATE OF CORRECTION

PATENT NO.   : 6,012,283
DATED        : January 11, 2000
INVENTOR(S)  : Miller et al.

It is certified that error appears in the above-identified patent and that said Letters Patent is hereby corrected as shown below:

<u>Title page,</u>
Item [63], under Related U.S. Application Data: change "08/761,955" to -- 08/671,955 --.

<u>Column 1,</u>
Line 5, change "08/761,955" to -- 08/671,955 --.

<u>Column 11,</u>
Line 38, change "66" to -- 64 --.
Line 39, before "configured" insert -- is --.

<u>Column 12,</u>
Line 9, change "79" to -- 77 --.
Line 24, before "positioning" insert -- by --.

Signed and Sealed this

Sixteenth Day of July, 2002

*Attest:*

*Attesting Officer*

JAMES E. ROGAN
*Director of the United States Patent and Trademark Office*

Disclaimer 6,012,283—Robert N. Miller, Acworth, GA.; Robert P. Caren, Westlake Village, Calif.; Jack A. Ekchian, Belmont, Mass. METHOD AND APPARATUS FOR REDUCING POLLUTANTS. Patent dated Jan. 11, 2000. Disclaimer filed Sept. 11, 2003, by the assignee, Lockheed Martin Corp.

Hereby enters this disclaimer to claims 21, 22, 23, 36, 38 and 40, of said patent.

*(Official Gazette, November 11, 2003)*